United States Patent [19]

Southwick et al.

[11] Patent Number: 5,120,765
[45] Date of Patent: Jun. 9, 1992

[54] BLOCK COPOLYMER DISPERSIONS AND PROCESS TO PREPARE BLOCK COPOLYMER DISPERSIONS

[75] Inventors: Jeffrey G. Southwick, Houston; Kirk H. Raney, Sugar Land; John K. Borchardt, Houston, all of Tex.

[73] Assignee: Shell Oil Company, Houston, Tex.

[21] Appl. No.: 590,386

[22] Filed: Sep. 28, 1990

[51] Int. Cl.$^5$ .............. C08J 3/02; C08K 5/01; C08L 53/00

[52] U.S. Cl. ............... 524/505; 524/158; 524/556; 524/575; 524/745; 523/335

[58] Field of Search ............ 524/158, 505, 556, 575, 524/745; 523/335

[56] References Cited

U.S. PATENT DOCUMENTS

| | | | |
|---|---|---|---|
| 2,652,427 | 9/1953 | Shultz | 260/505 |
| 3,861,466 | 1/1975 | Gale | 166/273 |
| 3,892,698 | 7/1975 | Burke, Jr. | 523/335 |
| 4,199,490 | 4/1980 | Kamiya et al. | 524/501 |
| 4,282,131 | 8/1981 | Trousil | 260/29.7 |
| 4,358,403 | 11/1982 | Distler et al. | 524/745 |
| 4,483,960 | 11/1984 | Agarwal et al. | 524/499 |
| 4,810,745 | 3/1989 | Pike et al. | 524/516 |
| 4,835,217 | 5/1989 | Jorgensen et al. | 525/93 |

OTHER PUBLICATIONS

Chemistry & Industry, Detergents, Mar. 19, 1990, No. 6, pp. 187–191.
Surfactants in Consumer Products, Theory, Technology and Application, by J. Falbe, pp. 63–66.

*Primary Examiner*—Paul R. Michl
*Assistant Examiner*—Patrick Niland

[57] ABSTRACT

A process to produce a stable suspension of block copolymer particles in a water medium, and a stable suspension of block copolymer particles in a water medium is provided. The block copolymer is a polar functional group—containing vinyl aromatic/conjugated diolefin block copolymer which may optionally be hydrogenated. The use of $C_{15}$ to $C_{24}$ linear alkyl aromatic sulfonates has been found to be critical in preparation of these stable dispersions.

27 Claims, No Drawings

BLOCK COPOLYMER DISPERSIONS AND PROCESS TO PREPARE BLOCK COPOLYMER DISPERSIONS

FIELD OF THE INVENTION

This invention relates to compositions of block copolymer dispersed in water, to processes to prepare these dispersions, and to the use of certain linear alkyl aromatic sulfonates as dispersants.

BACKGROUND OF THE INVENTION

Stable emulsions or suspensions of rubbers in aqueous mediums are useful in many applications. Water base paints, adhesives, and rust proof coatings, are examples of such applications. Water based systems are advantageous over systems utilizing hydrocarbon solvents because of the environmental and safety impact of vaporizing hydrocarbon solvents. Water based systems also are generally more economical due to the expense of hydrocarbon solvents.

Emulsions or suspensions of rubbers in aqueous mediums may be formed by mixing rubbers containing solvents in high speed dispersers. This is usually accomplished with the aid of a viscosity control agent and a surfactant. Solvents, monomers, or softening oils are typically required to result in a dispersion which is of a particle size which is sufficiently small to ensure that the particles remain in suspension. Such a process is disclosed in U.S. Pat. No. 4,282,131. The presence of solvents is acceptable in some applications, but it is desirable in other applications to provide a suspension of rubber in which the rubber does not contain solvents.

It is therefore an object of the present invention to provide a process to prepare an aqueous dispersion of a block copolymer wherein the block copolymer does not require softening by addition of processing oil, solvent, or monomers. In another aspect, it is an object to provide a process to prepare an aqueous dispersion of a block copolymer wherein the dispersion is stable. In another aspect, it is an object to provide a composition comprising an aqueous continuous phase and a stable dispersion of block copolymer particles.

SUMMARY OF THE INVENTION

The objects of the present invention are achieved by a process to prepare a stable block copolymer dispersion in water, the process comprising the steps of: a) providing a functionalized block copolymer comprising at least one block comprising predominately vinyl aromatic monomer units and at least one block comprising predominately conjugated diolefin monomer units and on an average of at least one polar functional group per polymer molecule having an average particle size larger than 2 microns; b) combining the functionalized block copolymer with a $C_{15}$ to $C_{24}$ linear alkyl aromatic sulfonate, a thickener, and water, to form a rubber containing medium; and c) breaking the block copolymer particles into particles of an average size of 2 microns or less by shearing or cavitation at a temperature above the glass transition temperature of the vinyl aromatic domains of the functionalized block copolymer to form a stable dispersion of the block copolymer in water.

The present invention also provides the stable block copolymer dispersion in water which may be made by the process described above. A stable dispersion is one in which the suspended particles do not agglomerate, and can therefore be easily redispersed if they settle or cream.

The present invention also encompasses the use of the $C_{15}$ to $C_{24}$ linear alkyl aromatic sulfonate as a rubber particle dispersant in an aqueous medium. This particular linear alkyl aromatic sulfonate has been found to be uniquely effective in preparing the stable dispersion of this invention.

DETAILED DESCRIPTION OF THE INVENTION

The $C_{15}$ to $C_{24}$ linear alkyl aromatic sulfonate is of the general formula:

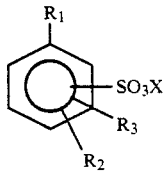

wherein
- $R_1$ is an essentially linear hydrocarbon having 15 to about 24 carbon atoms, bonded to the aromatic ring at either a terminal or an internal carbon atom,
- $R_2$ and $R_3$ are independently selected from the group consisting of hydrogen and alkyls having from 1 to 2 carbon atoms, and
- X is selected from a group consisting of monovalent metals and ammonium ions.

Linear alkyl aromatic sulfonates are known to be useful in enhanced oil recovery, household cleaning and in other surfactant applications, and are well known in the chemical industry. Linear alkyl aromatic sulfonates having about 18 carbon atoms in the linear alkyl group are known to be useful in enhanced oil recovery, as disclosed in U.S. Pat. No. 2,652,427, incorporated herein by reference.

Linear alkyl aromatic sulfonates can be produced by alkylation of the base aromatic, and then sulfonation of the alkylated aromatic. The base aromatic can be, for example, benzene, toluene, ethylbenzene or any one of the xylene isomers. Alkylation is typically performed by reacting the aromatic with a linear monoolefin or a halogenated linear paraffin in the presence of a catalyst such as aluminum chloride or hydrogen fluoride. Linear olefins are usually produced by dehydrogenation of linear paraffins, or by ethylene oligomerization. The linear paraffin may be separated from kerosene and gas oil distillation fractions from crude oil. The alkylated aromatic may be sulfonated by reaction with oleum, sulfuric acid or gaseous sulfur trioxide. The sulfonated alkyl aromatics are typically hydrolyzed to convert anhydride form products to the sulfonic acid form, and then neutralized by direct contact with a base such as sodium hydroxide.

Sulfonation of the linear alkyl aromatic with $SO_3$ may be performed in a Ballestra continuous $SO_3$ sulfonation reactor or a Stratford Engineering continuous $SO_3$ sulfonation reactor. These reactors and processes utilizing them are described in U.S. Pat. No. 3,198,849 and 3,107,087 respectively, incorporated herein by reference. An acceptable continuous $SO_3$ sulfonation reactor system is also available from Chemithon.

The length of the linear alkyl chain is critical to the present invention. Linear alkyl aromatic sulfonates having 11 to 14 carbon atom alkyl chains are typically utilized as household detergents, but these alkyl chain lengths are not effective in the preparation of the stable rubber suspensions of the present invention. Linear alkyl aromatic sulfonates having $C_{15}$ to $C_{24}$ alkyl groups are effective. The alkyl groups may be mixtures of different chain lengths and may contain some chain lengths outside of this range, but at least a portion must be within this range and preferably the average linear alkyl chain length is within the range of 15 to 24.

The linear alkyl groups preferably have from 16 to 20 carbon atoms, on the average, and most preferably have about 18 carbon atoms.

The aromatic group may be substituted with alkyls other than the $C_{15}$ to $C_{24}$ linear alkyl and the sulfonic group, but when the aromatic ring is substituted with other groups, the other groups are preferably lower alkyl groups. The lower alkyl groups preferably have only one or two carbon atoms in order to not sterically hinder the ring to alkylation or subsequent sulfonation. The most preferred aromatics include benzene, toluene, and xylenes due to commercial availability.

The block copolymer of this invention comprise at least one polymeric block which comprises predominantly vinyl aromatic hydrocarbon monomer units and at least one polymeric block which comprises, before hydrogenation, predominantly conjugated diolefin monomer units, the block copolymer having been modified by incorporating polar functionality.

The block copolymer may be linear, branched, or radial, and the blocks may be prepared by sequential addition of monomers or coupled. Linear block copolymers useful include those described in U.S. Pat. Nos. 3,231,635; 3,265,765 and 3,322,856, incorporated herein by reference. In general, linear or branched block copolymers which may be functionalized and then useful in this invention include those that may be represented by the general formula:

$$A_z-(B-A)_y-B_x$$

wherein:
A is a linear or branched polymeric block comprising predominantly vinyl aromatic hydrocarbon monomer units;
B is a linear or branched polymeric block containing predominantly conjugated diolefin monomer units;
x and z are, independently, a number equal to 0 or 1; and
y is a whole number ranging from 1 to about 20.

Coupled and radial block copolymers of this invention include polymers of the type described in U.S. Pat. Nos. 4,033,888; 4,077,893; 4,141,847; 4,391,949 and 4,444,953, incorporated herein by reference. Coupled and radial block copolymers which may be functionalized and then useful in this invention include those that may be represented by the general formula:

$$[B_x-(A-B)_y-A_z]_n-C-P_{n'}$$

wherein:
A, B, x, y and z are as previously defined;
n and n' are numbers from 0 to about 100 and where $n + n' \geq 3$
C is the core of the coupled or radial polymer formed with a polyfunctional coupling agent; and
each P is the same or a different polymer block or polymer segment having the general formula:

$$B'_{x'}-(A'-B'')_{y'}-A''_{z'}$$

wherein:
A" is a polymer block containing predominantly vinyl aromatic hydrocarbon monomer units which may be the same or different from A;
B' is a polymer block containing predominantly conjugated diolefin monomer units which may be the same or different from B;
A'—B" is a polymer block containing aromatic hydrocarbon monomer units (A') and conjugated diolefin monomer units (B"), the A'—B" monomer units may be random, tapered or block and when each of A' and B" is blocked, the A' block may be the same or different from A" and B" may be the same or different from B';
x' and z' are, independently, numbers equal to 0 or 1; and
y' is a number from 0 to about 20, and the sum of x' plus y' plus z' is greater than or equal to 1.

The coupled and radial polymer may, then, be symmetric or asymmetric.

For convenience, the linear, branched, coupled and radial polymers which may be functionalized and then useful in this invention will, sometimes, herein be referred to as base block copolymers.

The proportion of the vinyl aromatic blocks in the base block copolymer is preferably between about 2 and about 65 percent by weight, and more preferably between about 5 and about 40 percent by weight. A higher vinyl aromatic block content results in a hard rather than a rubbery polymer. The vinyl aromatic blocks must comprise a sufficient amount of the polymer to form vinyl aromatic domains.

The average molecular weights of the individual blocks may vary within certain limits. The vinyl aromatic blocks will have average molecular weights in the order of about 1,000 to about 125,000, preferably about 2,000 to about 60,000 and most preferably between about 4,000 and about 25,000. Vinyl aromatic block molecular weights which are lower than this are not sufficient for hard glassy domains to form, and therefore the block copolymer molecules do not have properties of vulcanized rubbers, but are like unvulcanized natural rubbers. The conjugated diolefin blocks either before or after hydrogenation will have average molecular weights of about 10,000 to about 450,000, preferably about 15,000 to about 150,000 and most preferably between about 20,000 and 100,000. Higher molecular weights result in a polymer which is difficult to process. These molecular weights are most accurately determined by gel permeation chromotography and/or low angle light scattering techniques.

The block copolymer of the present invention is preferably hydrogenated. Hydrogenation may be accomplished using any of the methods known in the prior art, the hydrogenation will most preferably be accomplished using a method such as those taught in U.S. Pat. Nos. 3,494,942; 3,634,594; 3,670,054; 3,700,633 and Re 27,145, incorporated herein by reference.

Hydrogenation preferably reduces the ethylenic unsaturation of the base polymer to less than 10% of the original ethylenic unsaturation, more preferably to less than 2%. Aromatic unsaturation is preferably reduced by less than 10% by the selective hydrogenation of the base block copolymer, and is more preferably reduced by less than 5%.

The block copolymer of this invention must comprise polar functionality. This polar functionality may be grafted to the base polymer, or may be incorporated into the base polymer by copolymerizing functional group containing monomers. For example, t-butyl methacrylate may be anionically polymerized with the other monomers to provide carboxyl groups within the base block copolymer. The ester group of the polymerized methacrylate may be then hydrolyzed to form an acid group.

Preferred functional groups include carboxylic acid, salts or anhydrides of carboxylic acids, sulfonic acids, salts or anhydrides of sulfonic acids, esters, alcohols, amines, epoxide and ketones. Carboxylic acids and their anhydrides and epoxides are preferred.

Hydrogenated or selectively hydrogenated conjugated diolefin polymers containing residual ethylenic unsaturation may be functionalized with a carboxylic acid or carboxylic acid derivative simply by heating the polymer in the presence of an ethylenically unsaturated carboxylic acid or carboxylic acid derivative. The carboxylic acid or carboxylic acid derivative may be monofunctional such as acrylic, methacrylic, cinnamic, crotonic, isocrotonic, mesaconic, α-methylmesaconic and the like or polyfunctional, particularly disfunctional, such as maleic, fumaric, itaconic, citraconic and the like. Functionalization which is accomplished thermally in this manner is taught, for example, in U.S. Pat. Nos. 4,292,414 and 4,308,353 which are incorporated herein by reference. With this process, incorporation of isolated carboxylic acid groups or in some cases a chain thereof onto the polymer baclbone is possible. The thermal addition reaction may, of course, involve the use of thermally generated free radicals.

Conjugated diolefin polymers which may or may not contain residual ethylenic unsaturation may be carboxylated by free radical grafting of an unsaturated acid or anhydride onto the polymer at an elevated temperature in the presence of a free-radical initiator. Grafting via a free radical mechanism is taught, for example, in U.S. Pat. No. 4,578,429, incorporated herein by reference.

A wide variety of processes are known to graft polar functional groups to block copolymers. While any of these methods can be utilized to effect functionalization of the block copolymer of this invention, functionalization of the polymer via grafting through a free radical mechanism such as that taught in U.S. Pat. No. 4,578,429 is preferred. This preference is due primarily to the low level of residual ethylenic unsaturation remaining in the conjugated diolefin segments of the functionalized polymers. This low level of unsaturation is possible due to the effectiveness of this process when the base polymer is hydrogenated a high degree.

Functionalized block copolymers useful in this invention will contain, on the average, one or more polar functional groups per polymer molecule. Preferably, they contain from one to about 50 polar functional groups, on the average, per polymer molecule. More preferably, they contain on the average, between about 10 and 40, and most preferably between about 15 and about 25 functional groups per polymer molecule. Lesser amounts of functionality fails to result in stable dispersions, whereas greater amounts of functionality result in polymers which are difficult to process. Higher levels of functionality are also generally difficult and expensive to achieve.

In order for a stable dispersion of block copolymer to be formed, a thickener is also required. The particular thickener utilized is not critical and a wide variety may be utilized. Thickeners may be simple thickeners, or may also function as thixotropic agents. Thixotropic agents are incorporated in suspension or emulsion compositions to raise low shear viscosities while retaining a low high shear viscosity. Thixotropic agents permit stirring, mixing. and application to substrates but reduce running and dripping after application to substrates. The amount of thickening agent required depends somewhat on the effectiveness of the particular thickening agent utilized, but generally about 0.1 to 20 parts by weight based on 100 parts by weight of functionalized block copolymer are required Acceptable classes of thickening agents include soap gels, lipophilic fatty acid esters, polysaccharide gums, water soluble cellulose derivatives and alumina gels. Useful thickeners which also function as thixotropic agents include organo clays. Organo clays are clays treated with quaternary ammonium compounds. Specific examples include dimethyl di(hydrogenated tallow) ammonium chlorides, dimethyl(hydrogenated tallow) benzylammonium chloride and metbyl di(hydrogenated tallow) benzylammonium chloride. Commercial products which are useful include Cyanamer ® P-250, available from American Cyanamid Co., and Acrysol ® ASE and Acrysol ® RM-5, available from Rohm and Haas Company.

The stable suspension may contain other known additives, such as fillers, pigments, antioxidants and cross-linking agents. These other components may be either in the water phase, the block copolymer phase, in a phase separate from both the block copolymer phase and the water phase or in a combination of the foregoing.

The water medium is preferably present in an amount of between about 50 and about 900 parts by weight based on 100 parts by weight of functionalized block copolymer. More preferably, the amount of water is between about 120 and about 300 parts by weight based on 100 parts by weight of functionalized block copolymer. With less water, the slurry is of a high viscosity. Larger amounts of water are generally not preferred due to the increased volume of material to be processed.

The components of the present invention are combined and processed under a high shear or cavitation at a temperature above the glass transition temperature of the vinyl aromatic domains of the functionalized block copolymer in order to form a stable dispersion. The functionalized block copolymer is preferably cryogenically ground to a fine particle size, such as 60 mesh, in order to expedite the formation of a small particle size in the aqueous medium. Although a number of high shear mixing devices could be utilized to form the stable suspension, an apparatus such as a Model M110ET Microfluidizer, available from Microfluidics Corp., Newton, Mass., has been demonstrated to perform well and is therefore preferred. This disperser heats a polymer slurry to above 200° C. under a high pressure, passes the slurry through two interaction chambers in series, and then rapidly cools the dispersion to near room temperature. The chambers contain channels which provide a focused interaction zone of intense turbulence causing a release of energy amid both cavitation and shear forces. Velocities in excess of 1500 feet per second are achieved and a pressure of 16,000 psi is utilized. A submerged jet principle is utilized to create the extremely small particle size. The slurry may be passed through a disperser such as this for a plurality of passes to result in a stable suspension. The rapid cooling of the slurry after shearing prevents reagglomeration of soft rubber particles and is a preferred aspect of this apparatus.

The cavitation or shearing is preferably sufficient to form rubber particles which are, on the average, of a particle size of about 2 microns or less. The rubber particles, in the stable suspension preferably also are of an average particle size of about 2 microns or less.

The dispersion created by the process of the present invention will not re-agglomerate, and if the dispersed solids do cream from the suspension, they are easily redispersed because they remain as discrete particles. This suspension is therefore useful as a base for paints, pressure sensitive adhesives, hot melt adhesives, rust proof coatings and modified asphalt compositions.

EXAMPLE

A Microfluidics Model M110ET Microfluidizer with a first chamber orifice of 200 microns and a second chamber orifice of 150 microns was utilized to prepare the suspensions of this Example. Several surfactants were combined with 100 parts by weight of either a functionalized or an unfunctionalized polymer, 1.6 parts by weight of ammonia as a pH control, and 6 parts by weight of Acrysol RM-5, a commercial thickener.

The functionalized polymer was a polystyrene-hydrogenated poly-butadiene-polystyrene block copolymer of about 50,000 molecular weight and 30%w styrene which after hydrogenation had been extruder grafted with maleic anhydride in the presence of a peroxide. The bound maleic anhydride level was 1.9%w.

The unfunctionalized polymer was a polystyrene-hydrogenated polybutadiene-polystyrene block copolymer of about 80,000 molecular weight and 13%w styrene.

Both polymers were cryogenically ground to particle size of less than 60 mesh.

The surfactants utilized included:
a) Witconate 1260 with cetyl alcohol. Witconate 1260 is available from Witco Corp., Houston, Texas, and is $C_{12}$ alkyl benzene sulfonate. The mixture was 40%wt Witconate 1260 and 60%wt cetyl alcohol.
b) Emcol 4500, which is available from Witco and is an anionic, dioctyl sodium sulfosuccinate.
c) Witcomul 4078, which is a mixture of unspecified surfactants available from Witco.
d) Petro BA, which is a commercially available alkyl napthalene acid-sulfonic sodium salt surfactant.
e) Neodol 25-12 and Neodol 25-3S, in equal portions. Neodol 25-12 is a linear alcohol ethoxylate nonionic surfactant and Neodol 25-3S is a linear alcohol ethoxy sulfate anionic surfactant. Both are available from Shell Chemical Company.
30%wt Witconate 1260 and 70%wt Neodol 25-12.
g) Igepal CO-997; a 70% active nonyl phenol ethoxylate nonionic surfactant available from GAF Corp.
h) LTS-18; a $C_{18}$ linear alkyl toluene sulfonate.
Of these surfactants and combinations of surfactants, only h) is within the scope of the present invention.

The initial temperature of the components was at about 280° C. for each run, and dropped about 6° C. for each pass through the Microfluidizer. The surfactant type and amounts, rubber type and results for 12 attempts to create stable rubber dispersions are listed in the Table below.

TABLE

| Run | Surfactant type | Surfactant parts by wt. per 100 parts Rubber | Rubber | Result |
|---|---|---|---|---|
| 1 | e | 16 | Funct. | Not acceptable: 1st pass - sample thickened slightly, but was still gritty no plugging, but did not achieve good dispersion |
| 2 | e | 16 | Non-funct. | Not acceptable: plugged quickly, polymer made it through the interaction chamber, but severely plugged the heat exchanger |
| 3 | f | 9 | Funct. | Not acceptable: 1st pass - thickened slightly, still gritty 2nd pass - less thick, less gritty 3rd pass - still better 4th pass - particle size reduced further, 1-15 micron size |
| 4 | d | 10 | Funct. | Not acceptable: 1st pass - gritty, no increase in viscosity 2nd pass - more viscous, more gritty 3rd pass - less viscous, very gritty, particle size is increasing |
| 5 | a | 21 | Funct. | Not acceptable: 1st pass - plugged with waxy agglomerates |
| 6 | b | 10 | Funct. | Not acceptable: 1st pass - still gritty 2nd through 5th passes - notable particle size reduction particle size was 2 micron and smaller, but upon sitting for one week, the particles creamed to the top of the water phase and agglomerated |
| 7 | g | 7 | Funct. | Not acceptable: 1st pass - came out lumpy |
| 8 | h | 8 | Funct. | Acceptable: 1st pass - slightly gritty, size reduction occurred 2nd pass - very little grit remains 3rd pass - grit free dispersion 4th and 5th pass - fine dispersion produced particle size was 2 micron and smaller and after sitting for one week at room temperature, some particles separated to a top phase, but were readily redispersed by mixing |
| 9 | c | 10 | Funct. | Not acceptable: 1st pass - very gritty, almost like sand 2nd pass - less gritty, but still pretty bad 3rd pass - somewhat improved 4th and 5th pass - continual improvement, but final product was greater than 2 microns |
| 10 | none | — | Funct. | Not acceptable: 1st pass - very gritty, but did not plug 2nd pass - started to plug |
| 11 | h | 8 | Non-funct. | Not acceptable: plugged quickly |

From the table, it can be seen that Run 8 was the only run resulting in an acceptable stable dispersion of rubber particles. The block copolymer which did not contain the polar function of groups could not be made to form a stable dispersion with otherwise identical conditions. Numerous surfactants were utilized, and only the $C_{18}$ linear alkyl toluene sulfonate resulted in a stable suspension. The combinations of variables which included other surfactants, or non-functionalized copolymers resulted in plugging, gritty, or lumpy compositions, particles larger than 2 microns, or otherwise unacceptable compositions.

We claim:

1. A process to produce a stable block copolymer dispersion in water, the process comprising the steps of:
   a) providing particles having an average particle size larger than 2 microns of a functionalized block copolymer comprising at least one block which comprises predominately conjugated diolefin monomer units, at least one block which comprises predominately vinyl aromatic monomer units and at least, on the average, one polar functional group per polymer molecule having;
   b) combining the functionalized block copolymer with a $C_{15}$ to $C_{24}$ linear alkyl aromatic sulfonate, a thickener and water to form a rubber containing aqueous medium; and
   c) breaking the block copolymer particles into particles of an average particle size of 2 microns or less by shearing or cavitation of the aqueous medium at a temperature above the glass transition temperature of the vinyl aromatic domains, forming a stable dispersion of block copolymer in water.

2. The process of claim 1 wherein the block copolymer particles are broken into 2 microns or smaller particles by shearing and cavitation.

3. The process of claim 2 wherein the shearing and cavitation is followed by rapidly cooling the block copolymer containing aqueous medium.

4. The process of claim 1 wherein the amount of functionalized block copolymer is 100 parts by weight and the amount of $C_{15}$ to $C_{24}$ linear alkyl aromatic sulfonate is from about 2 to about 40 parts by weight.

5. The process of claim 4 wherein the amount of functionalized block copolymer is 100 parts by weight and the amount of $C_{15}$ to $C_{24}$ linear alkyl aromatic sulfonate is from about 5 to about 12 parts by weight.

6. The process of claim 4 wherein the water is in an amount of from about 50 to about 900 parts by weight.

7. The process of claim 5 wherein the water is in an amount of from about 120 to about 300 parts by weight.

8. The process of claim 4 wherein the amount of thickener is from about 0.1 to about 20 parts by weight.

9. The process of claim 1 wherein the functionalized block copolymer comprises, on the average, from about 10 to about 40 polar functional groups per polymer molecule.

10. The process of claim 1 wherein the functionalized block copolymer comprises, on the average, from about 15 to about 25 polar functional groups per polymer molecule.

11. The process of claim 1 wherein the polar functional group is selected from the group consisting of carboxylic acid, carboxylic anhydrides, carboxylic salt, ester, alcohol, sulfonic acid, sulfonic salt, amine, epoxide, ketone and combinations thereof.

12. The process of claim 1 wherein the polar functional group is selected from the group consisting of carboxylic acid, carboxylic anhydride, epoxide, and mixtures thereof.

13. The process of claim 1 wherein the $C_{15}$ to $C_{24}$ linear alkyl aromatic sulfonate is a $C_{15}$ to $C_{24}$ linear alkyl toluene sulfonate.

14. The process of claim 13 wherein the linear alkyl toluene sulfonate is a $C_{16}$ to $C_{20}$ linear alkyl toluene sulfonate.

15. The process of claim 14 wherein the $C_{16}$ to $C_{20}$ linear alkyl toluene sulfonate is a $C_{18}$ linear alkyl toluene sulfonate.

16. The process of claim 1 wherein the vinyl aromatic is styrene.

17. The process of claim 16 wherein the conjugated diolefin is selected from the group consisting of butadiene, isoprene and mixtures thereof.

18. The process of claim 16 wherein the functionalized block copolymer is a linear triblock copolymer with polystyrene end blocks and a conjugated diolefin midblock.

19. The process of claim 1 wherein the functionalized block copolymer is a hydrogenated block copolymer, with 90 percent or more of the initial ethylenic unsaturation having been hydrogenated.

20. The process of claim 19 wherein the water is in an amount of from about 50 to about 900 parts by weight, and the functionalized block copolymer is present in an amount of 100 parts by weight.

21. The process of claim 20 wherein the amount of thickener is from about 0.1 to about 20 parts by weight.

22. The process of claim 21 wherein the polar functional group is selected from the group consisting of carboxylic acid, carboxylic anhydride, epoxide and a mixture thereof.

23. The process of claim 21 wherein the $C_{15}$ to $C_{24}$ linear alkyl aromatic sulfonate is a $C_{18}$ linear alkyl toluene sulfonate.

24. The process of claim 23 wherein the polar functional group is selected from the group consisting of carboxylic acid, carboxylic anhydride, epoxide, and mixtures thereof.

25. The process of claim 24 wherein the $C_{15}$ to $C_{24}$ linear alkyl aromatic sulfonate is a $C_{18}$ linear alkyl toluene sulfonate.

26. The process of claim 25 wherein the vinyl aromatic is styrene.

27. The process of claim 26 wherein the block copolymer is of a linear triblock structure with two polystyrene endblocks, and a hydrogenated conjugated diolefin midblock.

* * * * *